Patented May 12, 1936

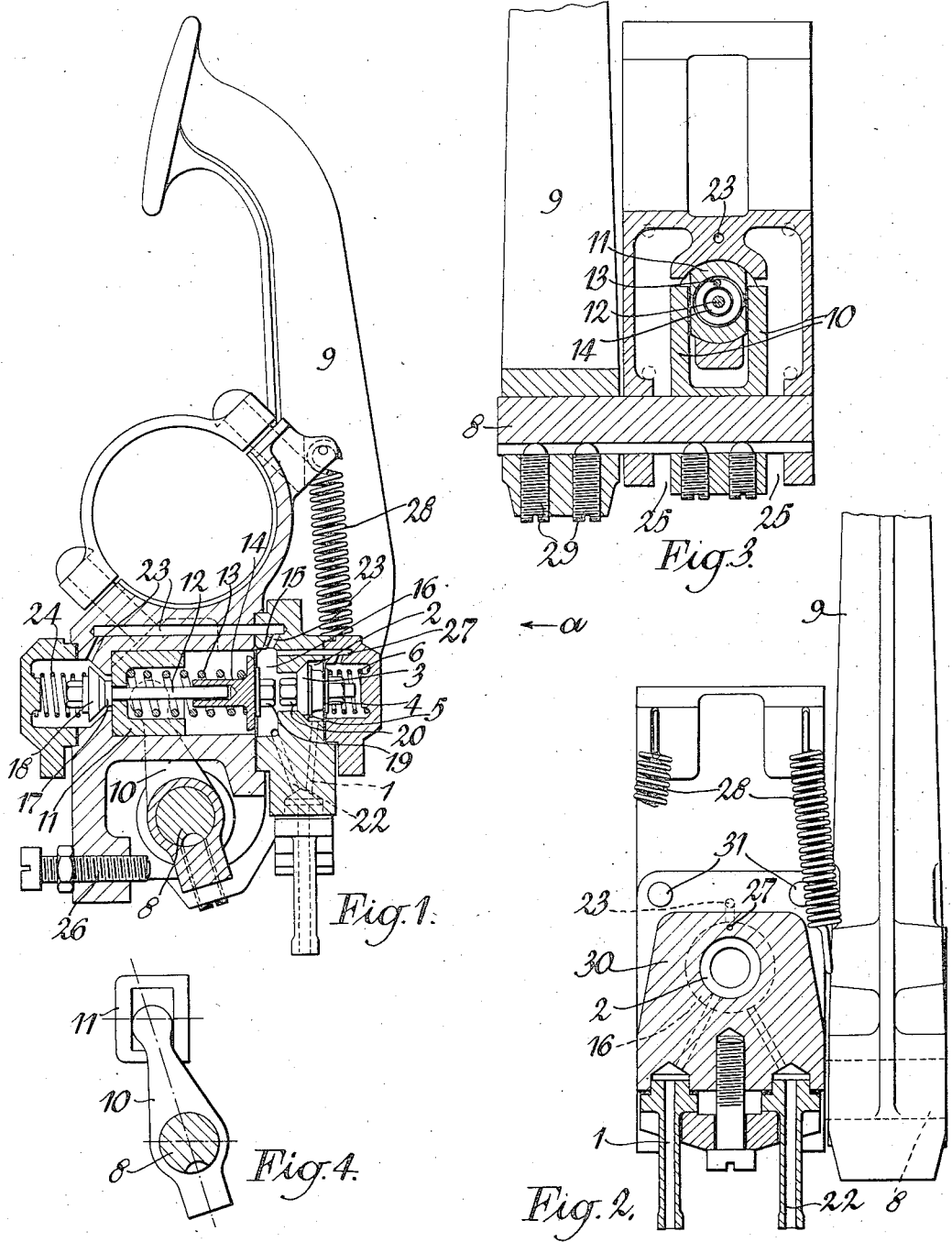

2,040,590

UNITED STATES PATENT OFFICE 2,040,590

REGULATOR FOR FLUID PRESSURE SYSTEMS

William Leicester Avery, Thorley, Bishop's Stortford, England

Application July 24, 1934, Serial No. 736,795
In Great Britain July 26, 1933

4 Claims. (Cl. 303—54)

This invention relates to regulators for fluid pressure systems, such as are adapted for use in the control of brakes on the wheels of aircraft and other vehicles, of the kind in which there is provided a controlling member, such as a pedal or like lever, operatively connected with an inlet valve and an exhaust valve in such manner that upon depressing the controlling member the inlet valve is urged off its seating to permit the flow of pressure fluid to the system being controlled, while the exhaust valve is simultaneously urged on to its seating, and upon releasing the controlling member the inlet valve is urged on to its seating to prevent the further supply of pressure fluid to the system being controlled, while the exhaust valve is permitted to open to release the fluid pressure in the said system.

In the employment of constructions of the above kind such as have hitherto been proposed the disadvantage has been encountered that variations in pressure of the fluid supply have caused corresponding variations in the operation of the regulator, and hence the system which it controls.

In connection with the above disadvantage it may be pointed out that the practice has been to employ in association with the inlet valve a diaphragm which, when the pressure upon it exceeds a predetermined value, is distorted and closes the valve and in the prior arrangements variations in the pressure of the supply have tended to influence the position of the inlet valve and thereby affect the controlled pressure in the system.

The invention has for its object to overcome the disadvantage above referred to and in general to devise an improved regulator of the kind described above.

One feature of the invention consists in the provision in a fluid regulator of the kind described of means adapted to neutralize or counterbalance the effect of supply pressure exerted upon the inlet valve and thus to prevent variations in the pressure of the fluid supply having any effect on the output pressure so long as the supply pressure does not fall below the output pressure required.

For example, according to one embodiment of the invention, the inlet valve is associated with a diaphragm or other flexible or yielding member adapted when the pressure in the system being controlled exceeds a predetermined value to close the valve, and with the latter there is associated a further diaphragm or other flexible or yielding member adapted when subjected to variations in pressure of the fluid supply to neutralize the effect of such variations in pressure acting upon the valve.

Further features of the invention will be hereinafter described with reference to the accompanying drawing, or claims.

In the accompanying drawing:—

Figure 1 is a longitudinal section through one form of regulator according to the invention, the foot pedal being shown in elevation;

Figure 2 is an end view of Figure 1 in the direction of the arrow $a$ and showing a part of the regulator in section and the remainder in elevation;

Figure 3 is a transverse section of Figure 1, and

Figure 4 illustrates a detail.

According to the form of the invention illustrated in the drawing air or other suitable fluid pressure medium is admitted to the regulator through an inlet 1 and to a chamber 2 formed between the inlet valve 3 and a diaphragm 4 which is secured to the inlet valve and has an effective area equal, or substantially equal, to that of the inlet valve which is normally maintained in a closed position against its seating 5 by means of a spring 6.

Keyed upon a shaft 8 is a foot pedal 9 and also a lever 10 which engages with a thimble 11 slidable upon a rod 12 around which there is provided a spring 13 bearing at one end against the inside of the thimble and at its other against a sleeve 14 upon the rod 12 which sleeve has a diaphragm 15 secured thereto so that a chamber 16 is formed between the diaphragm and the inlet valve. The foot pedal is under the control of a spring 28 which tends always to return the pedal to its inoperative position and so ensures the opening of the exhaust valve 18 in such position.

Normally the spring 13 urges the thimble 11 against a collar 17 on the rod 12 so as to maintain the exhaust valve 18 open and the end 19 of the sleeve 14 out of engagement with an extension 20 of the inlet valve 3 which can, therefore, be maintained closed by its spring 6.

Upon the foot pedal 9 being depressed the lever 10 is moved towards the diaphragm 15 with the result that the spring 13 is compressed and exerts pressure upon the diaphragm 15 so as to distort the same towards the inlet valve which, accordingly, is opened by the action of the end 19 of the sleeve 14 pressing against the extension 20 of the inlet valve and the pressure fluid is permitted to flow into the chamber 16 between the diaphragm 15 and the inlet valve and from this chamber passes to the brakes via the outlet 22. Simultaneously with the opening of the inlet valve the exhaust valve is closed by the action of its spring 24.

The chamber 16 has communication with the exhaust outlet 25 (Figure 3) via conduits 23 when the exhaust valve is open.

As pressure is built up in the system against the diaphragm 15 the spring 13 will eventually be overcome so that the diaphragm returns and the inlet valve 3 closes. It will be appreciated that the inlet valve through the action of the diaphragm 15 will always be closed at a pressure which is proportional to the loading of the spring 13 which loading is variable at will through the movement of the foot pedal 9.

In the position shown in Figure 1 the exhaust valve 18 is held open by the thimble 11 pressing against the collar 17 on the exhaust valve rod 12, but, as already described, the exhaust valve closes through the action of its own spring 24 when the thimble 11 is moved forward upon depression of the foot pedal. When it is desired to relieve pressure which has already been established in the brake system, the foot pedal is allowed to return towards its normally inoperative position whereby the pressure exerted upon the diaphragm 15 by the spring 13 will be reduced and so allow the fluid pressure upon the opposite side of the diaphragm 15 to distort the diaphragm so as to cause the sleeve 14 upon the exhaust valve rod to press against the end of this rod and thereby cause the exhaust valve to open. The pressure fluid will thus be free to escape through the exhaust outlets 25 until balance is again established, when the exhaust valve will automatically close. It will be seen, therefore, that any backward movement of the foot pedal will cause a proportional reduction in the pressure which may already be established in the system.

By providing an adjustable stop screw 26 which limits movement of the lever 10 the regulator can be adjusted so that a maximum predetermined outlet pressure cannot be exceeded, a feature which is very necessary when the regulator is used in conjunction with brakes on aircraft.

With an operating regulator as just described there is a serious disadvantage, namely, that variations in pressure of the fluid supply cause corresponding variations in the maximum pressure obtainable in the system and this is generally due to the relationship existing between the area of the inlet valve exposed to the source of supply and that of the diaphragm 15 which is exposed to the pressure in the brake system.

To overcome this defect there is provided in the regulator according to this invention the diaphragm 4 which, as above described, is rigidly attached at its centre to the inlet valve 3 and has an effective area equal, or approximately equal, to the same whereby it will be seen that the pressure fluid introduced into the chamber 2 between the inlet valve and this diaphragm 4 will exert an equal effort upon each so that the diaphragm will thus neutralize or counterbalance the effect of the fluid supply upon the inlet valve.

In the arrangement illustrated it will also be noticed that pressure built up in the chamber 16 between the diaphragm 15 and the inlet valve tends to open the latter so that as this pressure is variable according to the braking effort required its effect upon the inlet valve must also be compensated. This is done by providing a duct 27 connecting the chamber 16 with the opposite side of the chamber 2 whereby it will be appreciated that the pressure in the two chambers will always be equal so that the diaphragm 4 will also neutralize or counterbalance the effect of the pressure fluid upon the inlet valve on account of varying pressure within the system.

The regulator illustrated in the drawing is adaptable for use with the foot pedal on the right or left side of the regulator body. The foot pedal is shown in the left of the body, but if it is desired to have the pedal on the right, it is merely necessary to remove the grub screws 29 which secure the pedal upon the shaft 8 and displace this shaft laterally towards the right so that the shaft projects beyond the body at that side. The pedal can then be secured in position upon the shaft by the grub screws 29.

The regulator illustrated in the drawing is also adaptable for use with the inlet and outlet conduits either as shown in Figure 2 or at right-angles to the pedal or opposite the position shown. This is made possible by providing the conduits 1 and 22 upon a plate 30 which is removably secured to the regulator body by screws 31 and by providing screw openings in the body for engagement by these screws according to whichever position it is desired that the conduits should occupy in relation to the body.

Having now described my invention, what I claim as new and desire to secure by Letters Patent is:—

1. A regulator for a fluid pressure system, such as for the control of the brakes on a vehicle, comprising in combination a casing having therein an inlet valve and an exhaust valve independent of the inlet valve, a control member for opening the inlet valve and means for simultaneously closing the exhaust valve upon opening of the inlet valve, means adapted to counterbalance the inlet valve both against variations in the pressure in the supply fluid and against variations of pressure in the system, said counterbalancing means being always operative irrespective of the position of the inlet valve.

2. A regulator for a fluid pressure system, such as for the control of the brakes on a vehicle, comprising in combination a casing having an inlet valve and an exhaust valve therein, a control member connected with the exhaust valve such that upon actuation of this member the exhaust valve is closed and the inlet valve is opened, a diaphragm secured within said casing so as to define a chamber between one side thereof and the inlet valve, a duct providing communication between said chamber and the exhaust valve on the opposite side of said diaphragm, said chamber also having an outlet for the supply of the pressure fluid to the system, a diaphragm associated with the inlet valve so as to define a chamber between this valve and one side of the diaphragm, the second said chamber having an inlet for the supply of the pressure fluid to the interior of the regulator, and said diaphragm serving to counterbalance the inlet valve against variations in the pressure of the fluid admitted to the regulator, and a duct providing communication between the first mentioned chamber and the side of the second mentioned diaphragm remote from the inlet valve whereby the latter is also counterbalanced against variations in the pressure of the fluid within the system.

3. A regulator for a fluid pressure system, such as for the control of brakes on a vehicle, comprising in combination a casing having an inlet valve and an exhaust valve therein, a control member connected with the exhaust valve such that upon actuation of this member the exhaust valve is closed and the inlet valve is opened, the exhaust valve being normally resiliently urged into open position in which the inlet valve is maintained closed, a diaphragm secured within said casing so as to define a chamber between one side thereof and the inlet valve, a duct providing communication between said chamber and the exhaust valve on the opposite side of said diaphragm, said chamber also having an outlet for the supply of the pressure fluid to the system, a diaphragm associated with the inlet valve so as to define a chamber between this valve and one side of the diaphragm, the second said chamber having an inlet for the supply of the pressure fluid to the interior of the regulator, and said diaphragm serving to counterbalance the inlet valve against variations in the pressure of the fluid admitted to the regulator, and a duct providing communication between the first mentioned chamber and the side of the second mentioned diaphragm remote from the inlet valve whereby the latter is also counterbalanced against variations in the pressure of the fluid within the system.

4. A regulator for a fluid pressure system, such as for the control of brakes on a vehicle, comprising in combination a casing having an inlet valve for controlling the supply of pressure fluid from the interior of the casing to the system controlled thereby and an exhaust valve for relieving the pressure within the system when the inlet valve is closed, a diaphragm connected with the inlet valve so as to define a chamber between this valve and the diaphragm into which the pressure fluid enters in its passage to the system, said diaphragm having an effective cross sectional area equal substantially to the cross sectional area of the inlet valve so that it serves to counterbalance the effect of variations in the pressure of the fluid upon the inlet valve, and a duct providing open communication between the interior of the casing on the side of the inlet valve remote from the diaphragm and the side of the diaphragm remote from the inlet valve whereby the latter is also counterbalanced against variations in the pressure of the fluid within the system.

WILLIAM LEICESTER AVERY.